(12) United States Patent
Nussbaum

(10) Patent No.: US 10,974,913 B1
(45) Date of Patent: Apr. 13, 2021

(54) TILTING TRAY PRODUCTS SORTING APPARATUS

(71) Applicant: Berne Apparel Company, Ossian, IN (US)

(72) Inventor: John Eaton Nussbaum, Fort Wayne, IN (US)

(73) Assignee: Berne Apparel Company, Ossian, IN (US)

(*) Notice: Subject to any disclaimer, the term of this patent is extended or adjusted under 35 U.S.C. 154(b) by 0 days.

(21) Appl. No.: 16/676,720

(22) Filed: Nov. 7, 2019

(51) Int. Cl.
*B65G 47/96* (2006.01)

(52) U.S. Cl.
CPC ........... *B65G 47/962* (2013.01); *B65G 47/96* (2013.01); *B65G 2201/02* (2013.01)

(58) Field of Classification Search
CPC ... B65G 47/96; B65G 47/962; B65G 2201/02
USPC .................................................. 198/370.04
See application file for complete search history.

(56) References Cited

U.S. PATENT DOCUMENTS

| | | |
|---|---|---|
| 3,167,192 A | 1/1965 | Harrison |
| 3,252,596 A | 5/1966 | Beecher |
| 3,669,245 A * | 6/1972 | Wooten ................ B65G 47/962 198/370.04 |
| 3,974,909 A | 8/1976 | Johnson |
| 4,004,681 A | 1/1977 | Clewett |
| 4,089,404 A | 5/1978 | Venzke |
| 4,399,904 A * | 8/1983 | Canziani ............... B65G 47/962 104/140 |
| 4,461,378 A * | 7/1984 | Roth ...................... B65G 17/02 198/370.04 |
| 4,586,613 A * | 5/1986 | Horii ........................ B07C 5/36 198/370.04 |
| 4,726,464 A | 2/1988 | Canziani |
| 4,856,642 A | 8/1989 | Nicholson |
| 5,509,526 A | 4/1996 | Bonnet |
| 5,570,773 A | 11/1996 | Bonnet |
| 5,839,566 A | 11/1998 | Bonnet |
| 6,152,280 A * | 11/2000 | Bruun ................... B65G 17/065 198/370.04 |
| 6,206,170 B1 | 3/2001 | Kissel |
| 6,247,576 B1 | 6/2001 | Bonnet |
| 6,323,452 B1 | 11/2001 | Bonnet |
| 6,459,061 B1 | 10/2002 | Kugle |

(Continued)

*Primary Examiner* — James R Bidwell
(74) *Attorney, Agent, or Firm* — George Pappas; Barrett McNagny LLP

(57) ABSTRACT

A tilting tray products sorting apparatus employing belt and/or driven rollers conveyors for traversing tilting tray carriages between loading and unloading stations. A latch member between the carriage carrying tray and base is pivotable between a latched position for maintaining the tray level, and an unlatched position for tilting the tray. Tipping elements at each unloading station are selectively extended for engaging and pivoting the latch member to its unlatched position and tipping the tray. The tipping tray center of gravity maintains the tray in its tipped position. Leveling arms adjacent the conveyor engage tipped trays for pivoting them back to a level position and thereby pivoting the latch member to its latched position. The carriages gravitationally rest on and frictionally engage the conveyor carrying and traversing surface. Side walls along the conveyor maintain the carriages on the conveyor carrying and traversing surface.

20 Claims, 15 Drawing Sheets

(56) References Cited

U.S. PATENT DOCUMENTS

| | | | |
|---|---|---|---|
| 6,860,377 B2* | 3/2005 | Brixius | B65G 47/965 198/370.04 |
| 8,381,897 B2 | 2/2013 | Brunsen | |
| 8,727,103 B2 | 5/2014 | Vitalini | |
| 2004/0074738 A1* | 4/2004 | Brixius | B65G 47/965 198/370.04 |
| 2012/0125735 A1 | 5/2012 | Schuitema | |
| 2016/0137429 A1* | 5/2016 | Berdelle-Hilge | B65G 47/962 198/370.04 |

* cited by examiner

TILTING TRAY PRODUCTS SORTING APPARATUS

BACKGROUND OF THE INVENTION

1. Field of the Invention

The present invention relates to the field of apparatus and methods for sorting products. More particularly, the present invention relates to the field of apparatus and methods wherein products are sorted by loading the products onto tilting tray carriages which traverse to one of a plurality of desired stations and then unload the products by tilting the carriage tray.

2. Background

Apparatus for sorting products are today commonly used, for example, in distribution centers whereat incoming products must be sorted for distribution/delivery to multiple different locations. The apparatus typically comprise multiple tilting tray carriages coupled to a closed loop conveyor which traverses the carriages between loading stations whereat products are loaded onto the carriages and unloading stations associated with the particular desired delivery locations. The carriages typically employ a tray which remains level while the carriage is traversed from a loading station to a desired unloading station whereat the tray is tilted for thereby unloading the product at that desired unloading station. Examples of such known sorting apparatus are shown and described in Schuitema et al., US 2012/0125735; Kugle, et al., U.S. Pat. No. 6,459,061; Kissel et al., U.S. Pat. No. 6,206,170; Bonnet, U.S. Pat. No. 5,509,526; Nicholson et al., U.S. Pat. No. 4,856,642; and Canziani U.S. Pat. No. 4,399,904.

Prior sorting apparatus, however, typically employ wheeled carriages adapted to traverse or to be coupled to conveyors designed and built specifically for those particular carriages thereby making it quite difficult and costly to modify the conveyor path. The carriages also typically employ complex mechanisms for tilting the products carrying tray and thereby significantly increase the sorting apparatus cost.

Accordingly, a need exists for an improved tilting tray products sorting apparatus comprising a relatively inexpensive reliable conveyor, the path of which can relatively easily be modified. The need also exists for a tilting tray products sorting apparatus wherein the carriages comprise a relatively inexpensive reliable tilting mechanism which decreases the sorting apparatus cost.

SUMMARY OF THE INVENTION

The present invention overcomes the disadvantages of prior tilting tray products sorting apparatus by utilizing common commercially available conveyors such as, for example, belt conveyors and driven rollers conveyors, by utilizing a relatively less complex mechanism for tilting the carriage products carrying tray and by constructing the tilting tray carriages with relatively inexpensive materials such as, for example, plywood, particleboard and/or other suitable planar materials.

In one form thereof, the present invention is directed to a tilting tray products sorting apparatus including a conveyor adapted to traverse a plurality of products carriages in a direction of travel between a loading station whereat products are selectively loaded on the carriages and unloading stations whereat products on the carriages are selectively unloaded. The plurality of products carriages each include a products carrying tray adapted to selectively be placed and maintained in a generally level product carrying position and to selectively be placed in a generally tilted product unloading position at an angle relative to the product carrying position. The conveyor includes a carrying and traversing surface. The products carriages gravitationally rest on the conveyor carrying and traversing surface and are thereby traversed between the loading station and the unloading stations.

The conveyor preferably further includes first and second side walls. Each side wall projects vertically upwardly relative to the carrying and traversing surface and extends generally parallel to the carriages direction of travel. The first and second side walls are spaced from each other and thereby define a corral therebetween and above the carrying and traversing surface, whereby carriages traversed between the loading station and the unloading stations are contained within the corral by the side walls and are thereby maintained on the carrying and traversing surface. The plurality of products carriages each further preferably include a friction reduction wheel adapted to rotate about an axis of rotation extending generally perpendicular to the conveyor carrying and traversing surface and adapted to contact one of the side walls.

The conveyor can be one or more of a belt conveyor and a driven roller conveyor which define the carrying and traversing surface. The plurality of products carriages can each further include a base defining a substantially horizontal planar sled surface, the carrying and traversing surface is oriented substantially horizontally, and wherein the planar sled surface gravitationally rests on the conveyor substantially horizontal carrying and traversing surface. The plurality of products carriages can each further include a base having a forward arcuate end and a rear arcuate end and wherein, in the event the carriages are traversed by the conveyor along a nonlinear path and the front end of a first rear carriage contacts the rear end of a second forward adjacent carriage, the first carriage forward arcuate end engages the second carriage rear arcuate end at a single point of contact along and between the forward arcuate end and the rear arcuate end. The conveyor typically forms a closed loop whereby, after the carriages are traversed to the unloading stations, they are returned to the loading station.

In another form thereof, the present invention is directed to a tilting tray products sorting apparatus including a conveyor adapted to traverse a plurality of products carriages in a direction of travel between a loading station whereat products are selectively loaded on the carriages and unloading stations whereat products on the carriages are selectively unloaded. The plurality of products carriages each include: a base; a products carrying tray pivotally secured to the base about a tray pivot axis located between the base and the carrying tray and extending generally parallel to the carriages direction of travel; a latch member comprising a beam and first and second legs extending from the beam at opposite ends of a central beam section, the legs extending generally parallel to each other whereby the central beam section and the first and second legs form a U-shape; wherein the central beam section is pivotally secured to the carrying tray about a latch pivot axis located between the tray pivot axis and the carrying tray and extending generally perpendicular to the carriages direction of travel; and, wherein the latch member is pivotable about the latch pivot axis between a latched position whereat the legs extend between the latch pivot axis and the base thereby preventing rotation of the carrying tray about the tray pivot axis and retaining the carrying tray in a generally level product carrying position, and an unlatched position whereat the legs extend to a position not between the latch pivot axis and the base thereby allowing rotation of the carrying tray about the tray pivot axis to a generally tilted product unloading position at an angle relative to the product carrying position, whereby products loaded on the carrying tray are maintained thereon as the carriage traverses between the loading station and the unloading station by placing the latch member in its latched position and maintaining the carrying tray in its level product carrying position, and whereby products loaded on the carrying tray may be unloaded therefrom by pivoting the latch member to its unlatched position and rotating the carrying tray about the tray axis to its tilted product unloading position.

The tilting tray products sorting apparatus further preferably includes: a first mechanism adjacent a first side of the conveyor adapted to selectively extend and retract a first tipping element between extended and retracted positions; wherein, in its extended position, the first tipping element intersects with a first leg travel path defined by a path the latch member first leg travels as the carriages traverse along their direction of travel and, in its retracted position, the first tipping element does not intersect with the first leg travel path; wherein, when the first tipping element is extended to its extended position while a carriage traverses adjacent thereto, the first tipping element engages the latch member first leg thereby pivoting the latch member to its unlatched position and rotating the carrying tray about the tray axis to a tilted product unloading position in a downwardly direction towards a second side of the conveyor; and, wherein, when the first tipping element is retracted to its retracted position while a carriage traverses adjacent thereto, the first tipping element does not engage the latch member first leg thereby allowing the latch member to remain in its latched position and the carrying tray in its level product carrying position.

The tilting tray products sorting apparatus of yet further preferably includes: a second mechanism adjacent the second side of the conveyor adapted to selectively extend and retract a second tipping element between extended and retracted positions; wherein, in its extended position, the second tipping element intersects with a second leg travel path defined by a path the latch member second leg travels as the carriages traverse along their direction of travel and, in its retracted position, the second tipping element does not intersect with the second leg travel path; wherein, when the second tipping element is extended to its extended position while a carriage traverses adjacent thereto, the second tipping element engages the latch member second leg thereby pivoting the latch member to its unlatched position and rotating the carrying tray about the tray axis to a tilted product unloading position in a downwardly direction towards the first side of the conveyor, and, wherein, when the second tipping element is retracted to its retracted position while a carriage traverses adjacent thereto, the second tipping element does not engage the latch member second leg thereby allowing the latch member to remain in its latched position and the carrying tray in its level product carrying position.

The tilting tray products sorting apparatus can further include: a first leveling arm adjacent the first side of the conveyor and a second leveling arm adjacent the second side of the conveyor; wherein, when a carriage traverses adjacent the first leveling arm and the carrying tray is in a tilted product unloading position in a downwardly direction towards the first side of the conveyor, the first leveling arm engages the carrying tray thereby pivoting the carrying tray about the pivot axis back to its level product carrying position and thereby also allowing the latch member to pivot from its unlatched position to its latched position; and, wherein, when a carriage traverses adjacent the second leveling arm and the carrying tray is in a tilted product unloading position in a downwardly direction towards the second side of the conveyor, the second leveling arm engages the carrying tray thereby pivoting the carrying tray about the pivot axis back to its level product carrying position and thereby also allowing the latch member to pivot from its unlatched position to its latched position.

Preferably, the tilting tray products sorting apparatus is constructed such that the products carrying tray pivot axis is located between the latch member first and second legs when the latch member is in its latched position; the products carrying tray and the latch member pivotally secured thereto together comprise a center of gravity above the carrying tray pivot axis whereby, after the carrying tray is rotated to its tilted product unloading position, the carrying tray is maintained in its tilted product unloading position; and, the latch member first and second legs comprise a cam surface extending at an angle relative to the carrying tray pivot axis when the latch member is in its unlatched position. The tilting tray products sorting apparatus preferably includes machine readable indicia secured to each carriage.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
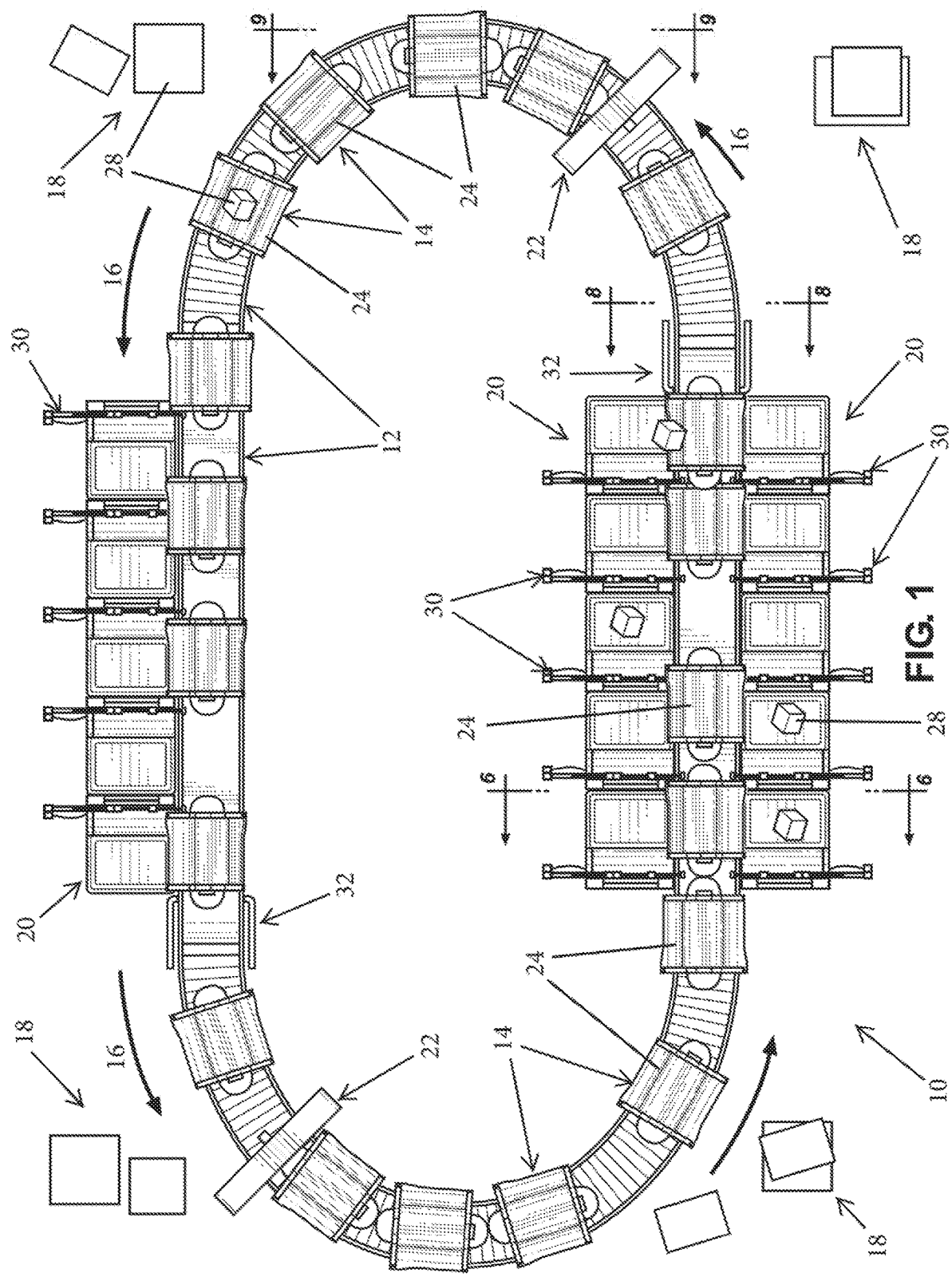
FIG. 1 is a top plan view of a tilting tray products sorting apparatus constructed in accordance with the principles of the present invention and showing a plurality of products carrying carriages being traversed along a closed loop conveyor between products loading stations and product unloading stations.
Figure 2:
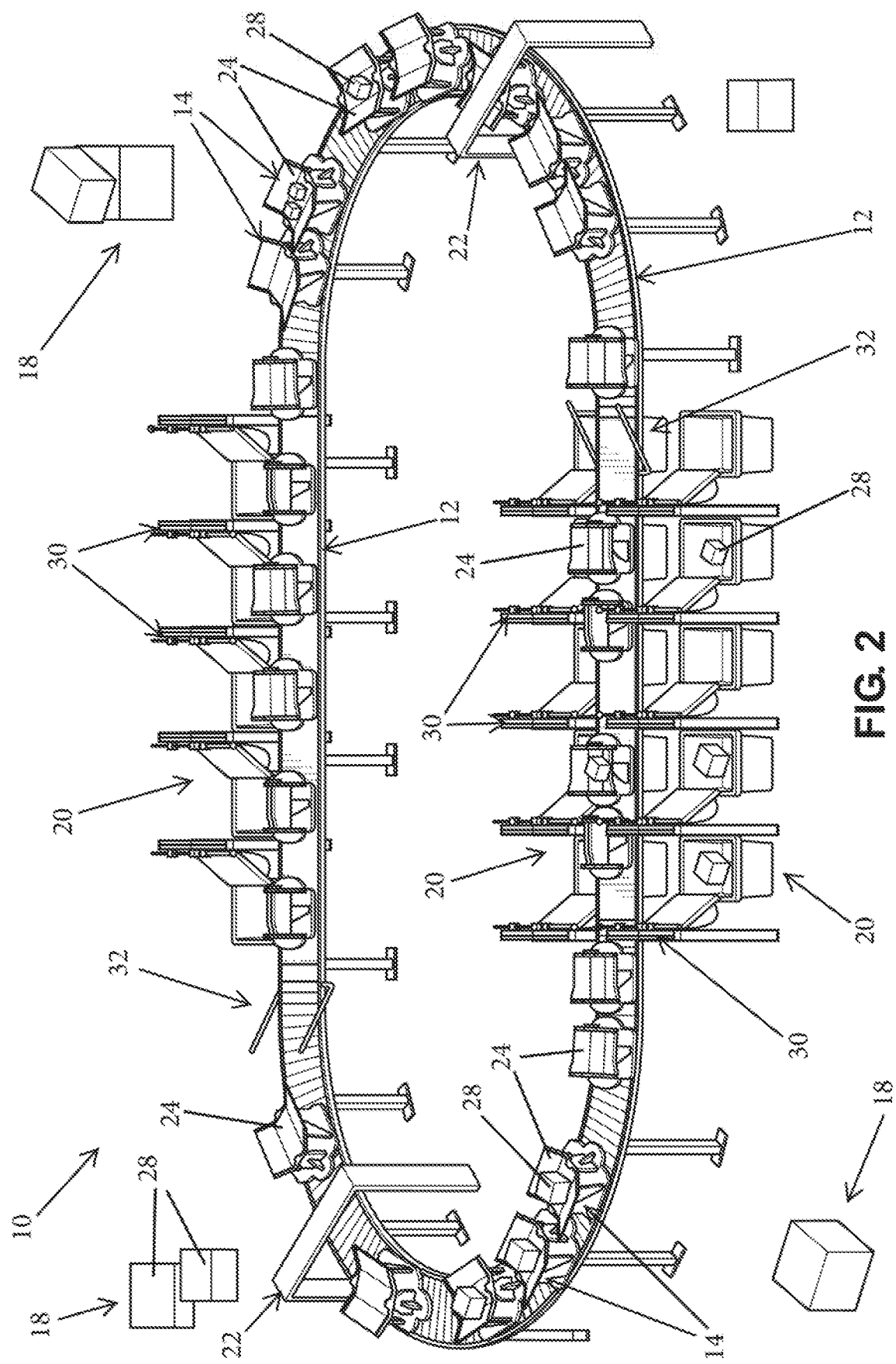
FIG. 2 is a perspective view of the tilting tray products sorting apparatus shown in FIG. 1.
Figure 3:
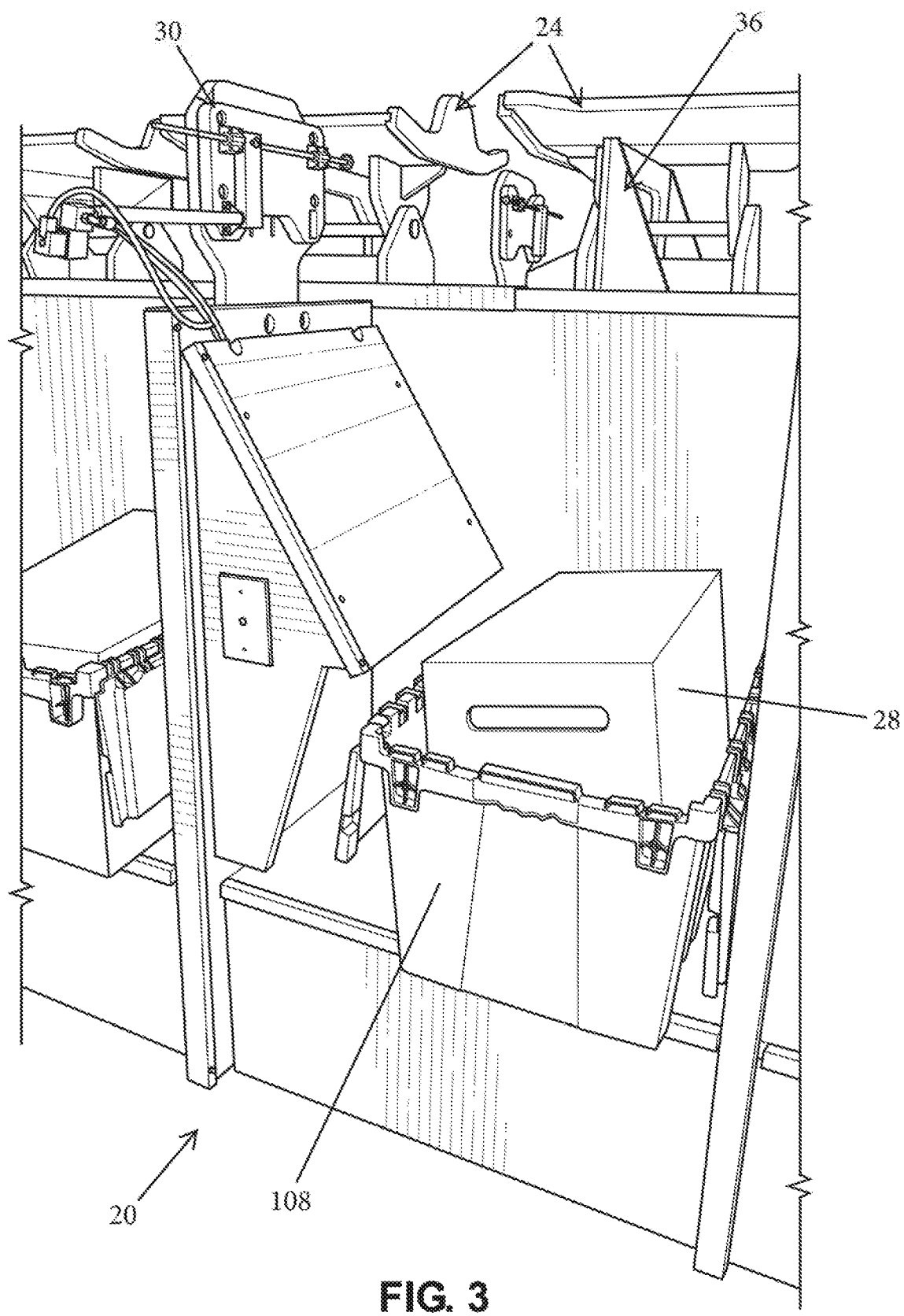
FIG. 3 is a perspective view of one of the unloading stations and tilt mechanisms thereat of the tilting tray products sorting apparatus shown in FIG. 1.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

A tilting tray products sorting apparatus constructed in accordance with the principles of the present invention is shown and designated in the drawings by the numeral 10. Apparatus 10 includes a conveyor 12 adapted to traverse/move a plurality of products carriages 14 in a direction of travel designated by the arrows 16 between loading stations 18 and unloading stations 20. Machine code reading stations 22 are provided intermittent the loading stations 18 and unloading stations 20.

Conveyor 12 is shown forming an endless/closed loop whereby the carriages 14 are continuously traversed there around. That is, after a particular carriage 14 passes a particular starting loading station 18 and then traverses through the apparatus one or more unloading stations 20, machine code reading stations 22 and/or additional loading stations 18, it returns to and again passes the particular starting loading station 18. It is noted that, although conveyor 12 is shown in the shape of circular oval loop, it is contemplated that conveyor 12 can be unidirectional and/or can take other endless/closed serpentine shapes as may be needed or desired.

Figure 8:
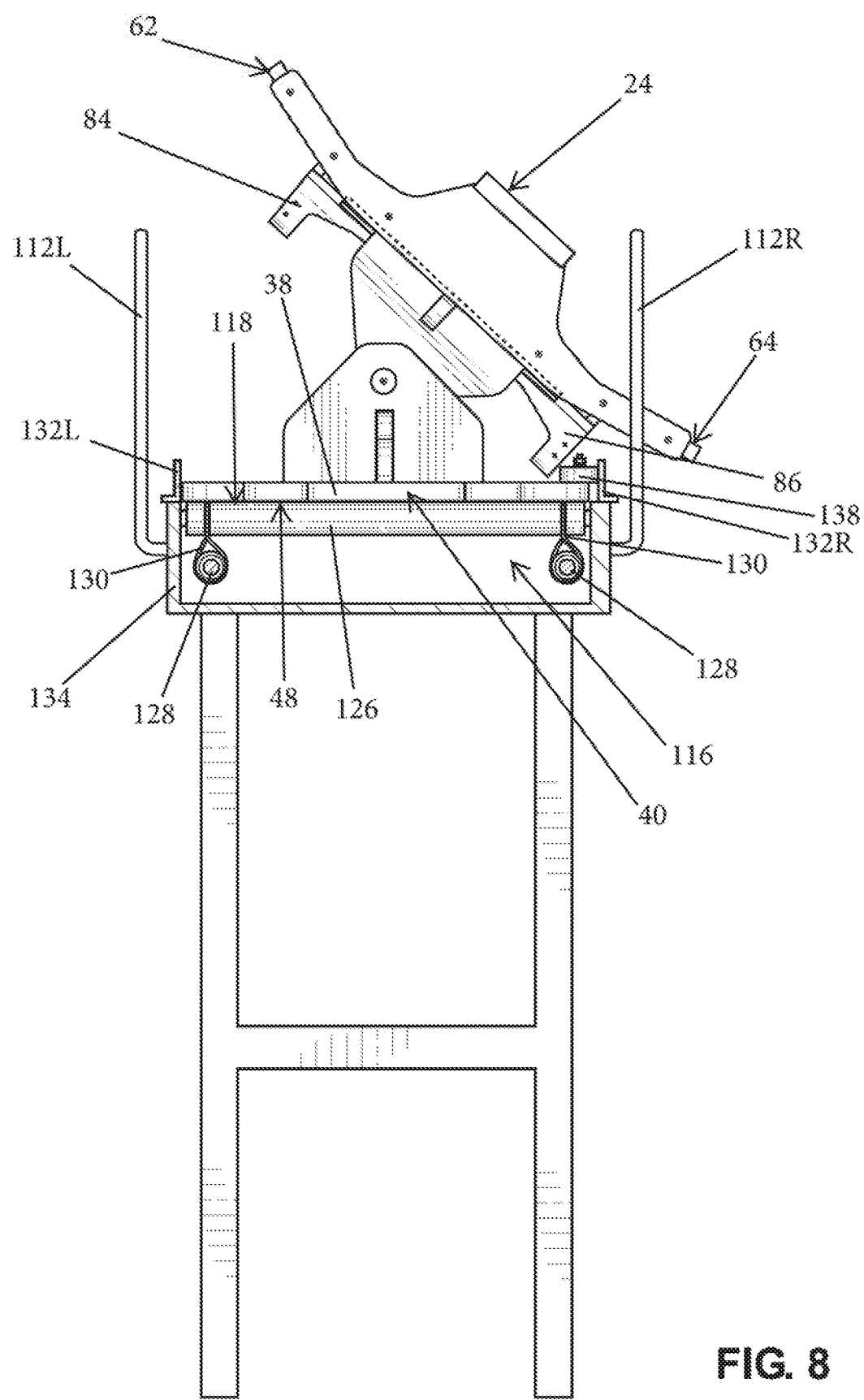
FIG. 8 is a cross section view of the conveyor taken along line 8-8 of FIG. 1 and showing the leveling station leveling arms and a products carriage with its carrying tray in its unloading position tilted towards the right side of the conveyor just prior to the right side leveling arm engaging the right side of the carrying tray.
Figure 9:
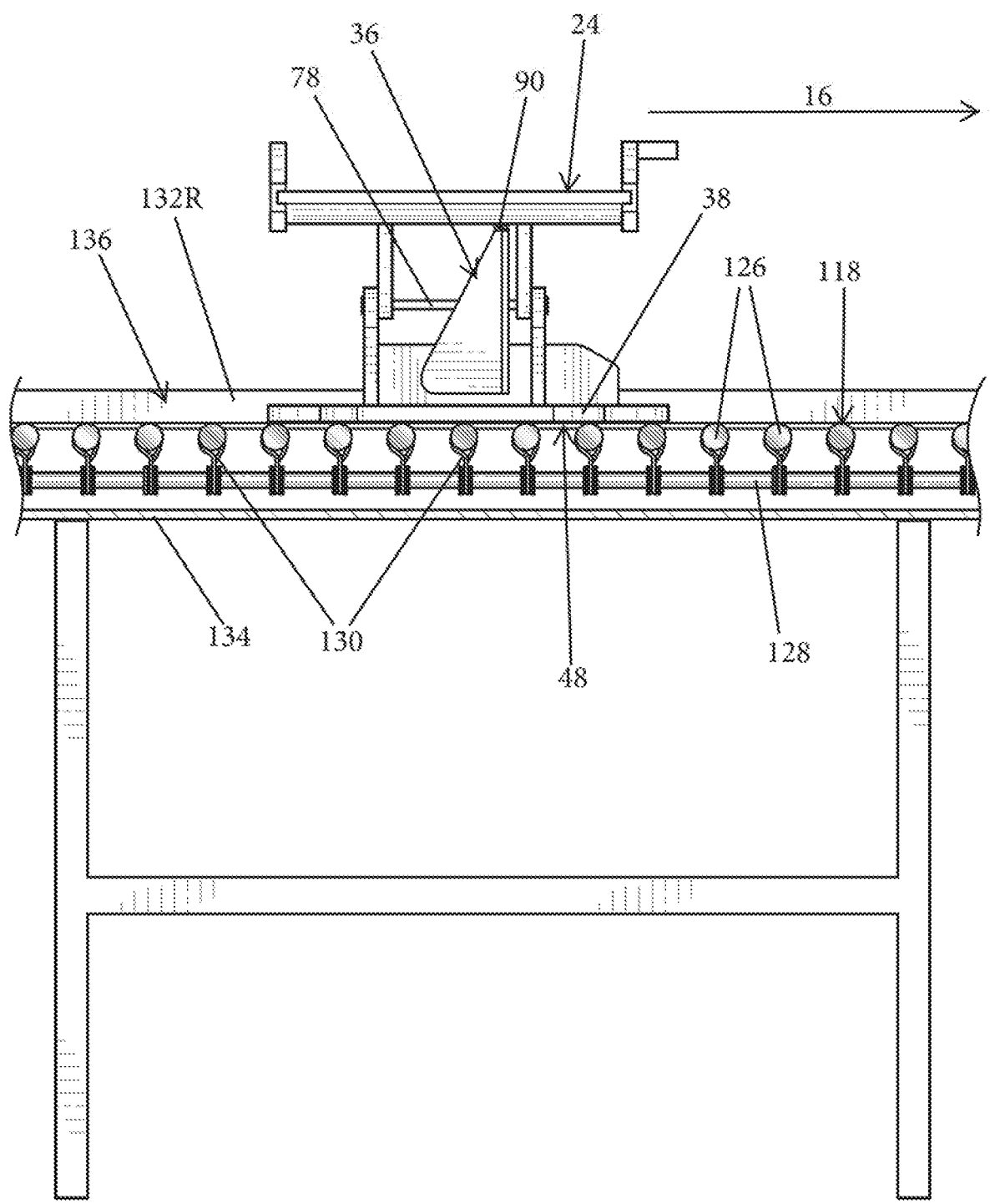
FIG. 9 is a cross section view of the conveyor taken along line 9-9 of FIG. 1 and showing a products carriage thereon.
Figure 10:
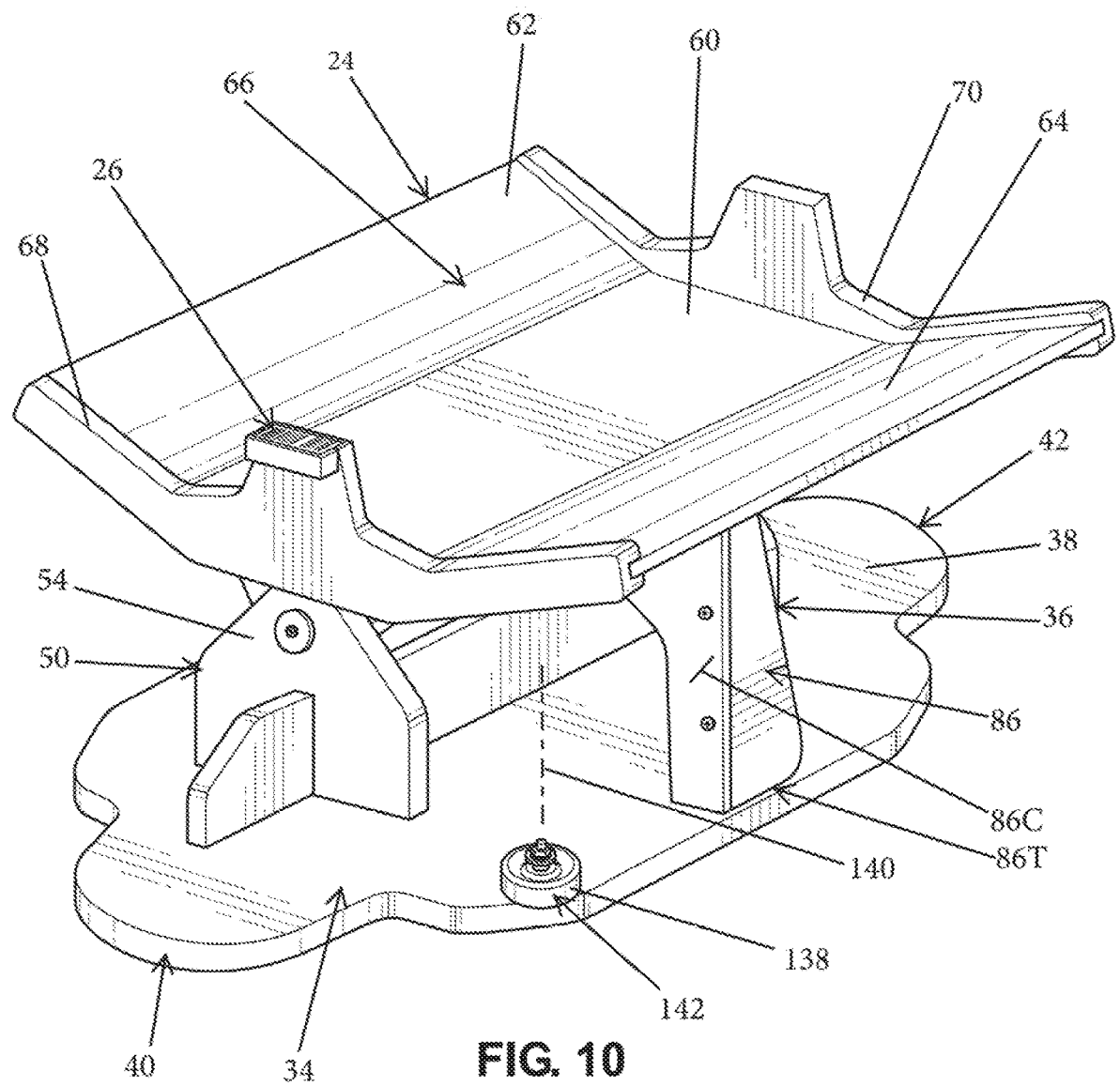
FIG. 10 is a perspective view of a products carrying carriage shown in FIG. 1 and constructed in accordance with the principles of the present invention.

The carriages 14 are each equipped with a products carrying tray 24 which, as more fully described herein below, is adapted to selectively be placed and maintained in a generally level product carrying position as shown in FIGS. 6, 7 and 9-12, and to selectively be placed in a generally tilted product unloading position at an angle relative to the product carrying position as shown in FIGS. 8 and 14-16. Carriages 14 are each also provided with unique machine readable indicia 26, such as a barcode, preferably on the products carrying tray 24 as shown in FIG. 10.

In operation, product carriages 14 are traversed to and approach the loading stations 18 with their carrying tray 24 in a generally level product carrying position. At the loading stations 18, various products 28, each also provided with unique machine readable indicia (not shown), are loaded upon a carriage carrying tray 24 manually and/or automatically. As the level loaded carriages 14 are traversed by the conveyor 12 through the machine code reading stations 22, the machine readable indicia 26 of each carriage 14 and the machine readable indicia of the loaded product 28 thereon (if a product was loaded thereon) are read and provided to a controller (not shown). The controller is programmed to monitor the speed of the conveyor 12 in the direction of travel 16 and, hence, also the speed of the carriages 14 being traversed thereon. The distance along the conveyor 12 between a machine code reading station 22 and each unloading station 20 is also provided to the controller. Additionally, the controller is provided with data regarding the particular desired unloading station 20 each product 28 is to be delivered. When the controller reads the machine readable indicia of a product 28 on a carriage 14 and determines the particular desired unloading station 20 to which the product 28 is to be delivered, it calculates the delivery time which will lapse for the carriage 14 to reach the particular desired unloading station 20 using the speed of the conveyor 12 and the distance between the machine code reading station 22 and the particular desired unloading station 20. When the delivery time has elapsed, the controller activates a tilt mechanism 30 at the particular desired unloading station 20 which, as more fully described herein below, causes the carrying tray 24 to be placed in the generally tilted product unloading position for thereby causing the product 28 to be unloaded/slide off of the carrying tray 24. After passing through the unloading stations 20, the carriages 14 are traversed to and through a leveling station 32 whereat the carrying trays 24 which were used to deliver a product 28 to and unloading station 20 and which are in their tilted product unloading position, as more fully described herein below, are restored/pivoted back to their level product carrying position for again loading another product 28 thereon and repeating the process.

Referring now more particularly to FIGS. 10-16, carriages 14 each include a base 34 adapted to gravitationally rest on the conveyor 12, a latch member 36 and a products carrying tray 24 mentioned herein above. Advantageously, the base 34, latch member 36 and carrying tray 24 can be constructed using plywood, particleboard and/or other suitable planar materials which, for example, can be 0.5 inch to 1.5 inch thick. Base 34 preferably includes a bearing plate 38 defined by a front or forward end arcuate edge 40, a rear end arcuate edge 42 and, as viewed from the front edge 40, a left side edge 44 and right side edge 46. The bottom of the bearing plate 38 defines a substantially horizontal planar sled surface 48.

A bracket 50 is affixed to the top surface 52 of the bearing plate 38 for pivotally securing the carrying tray 24 thereto. Bracket 50 includes a pair of shoulder members 54 which are secured to the bearing plate 38 and extend orthogonally upwardly therefrom. Gussets 56 are provided between the shoulder members 54 and the bearing plate 38 for solidly orthogonally securing the shoulder members 54 to the bearing plate 38. Shoulder members 54 are provided with aligned through holes 58.

Figure 13:
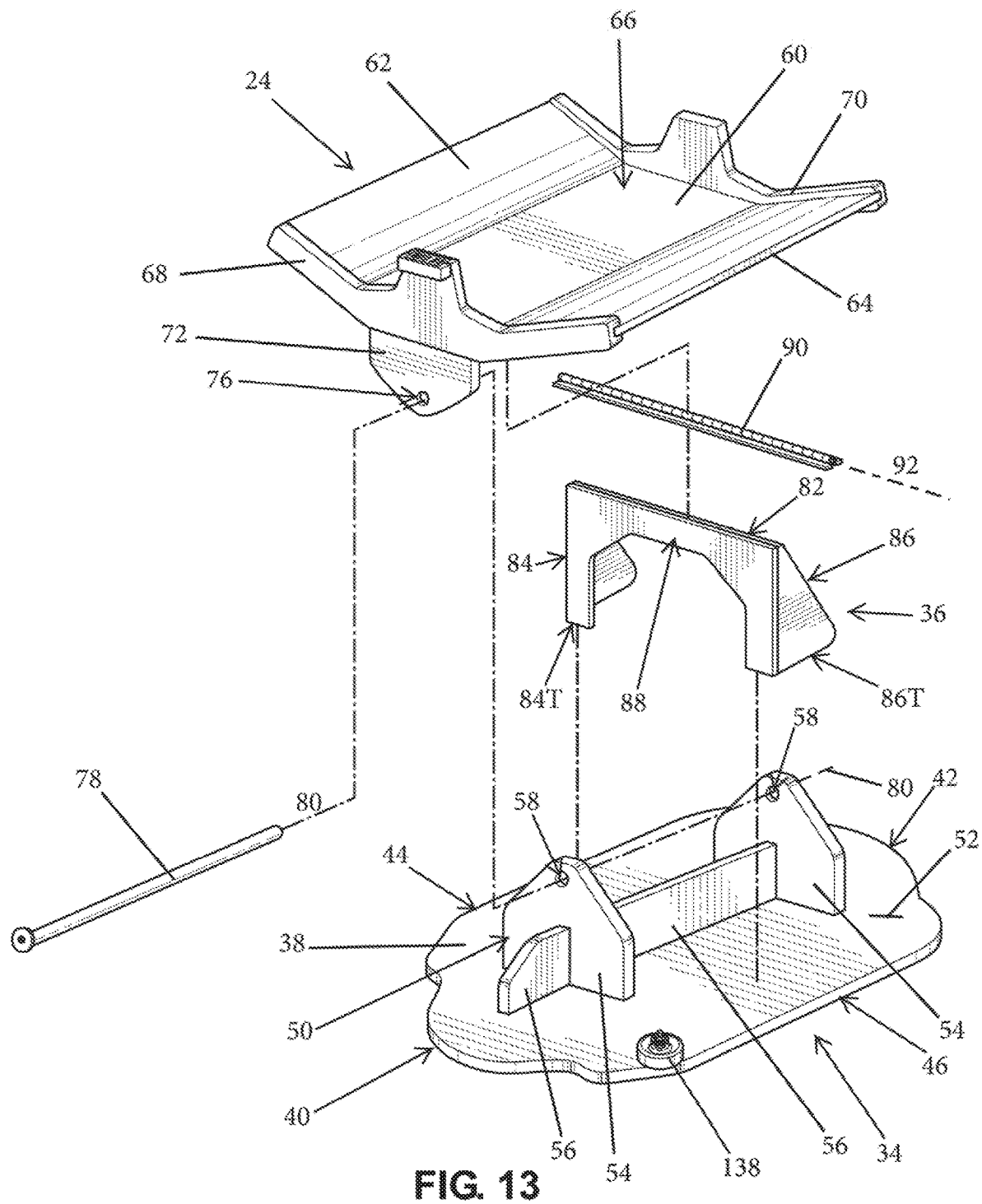
FIG. 13 is an exploded view of the products carrying carriage shown in FIG. 10.

The carrying tray 24 is preferably constructed comprising a central valley section 60, and, as viewed from the front edge 40, respective left and right upwardly angled wings 62, 64. Respective front and rear walls 68, 70 are provided at the terminal forward and rear edges of the central valley section 60 and left and right wings 62, 64. A trough 66 is thereby formed between the left and right wings 62, 64 and front and rear walls 68, 70 assisting in maintaining products 28 thereon when the carrying tray 24 is in its level product carrying position. The carriage machine readable indicia 26 may be provided on the front wall 68 as shown in FIGS. 10 and 13. Arms 72 are affixed to the bottom of the carrying tray 24 central valley section 60 and extend orthogonally downwardly therefrom. Gussets 74 are provided between the arms 72 and the central valley section 60 for solidly orthogonally securing the arms 72 to the carrying tray 24. Arms 72 are provided with aligned through holes 76.

Figure 7:
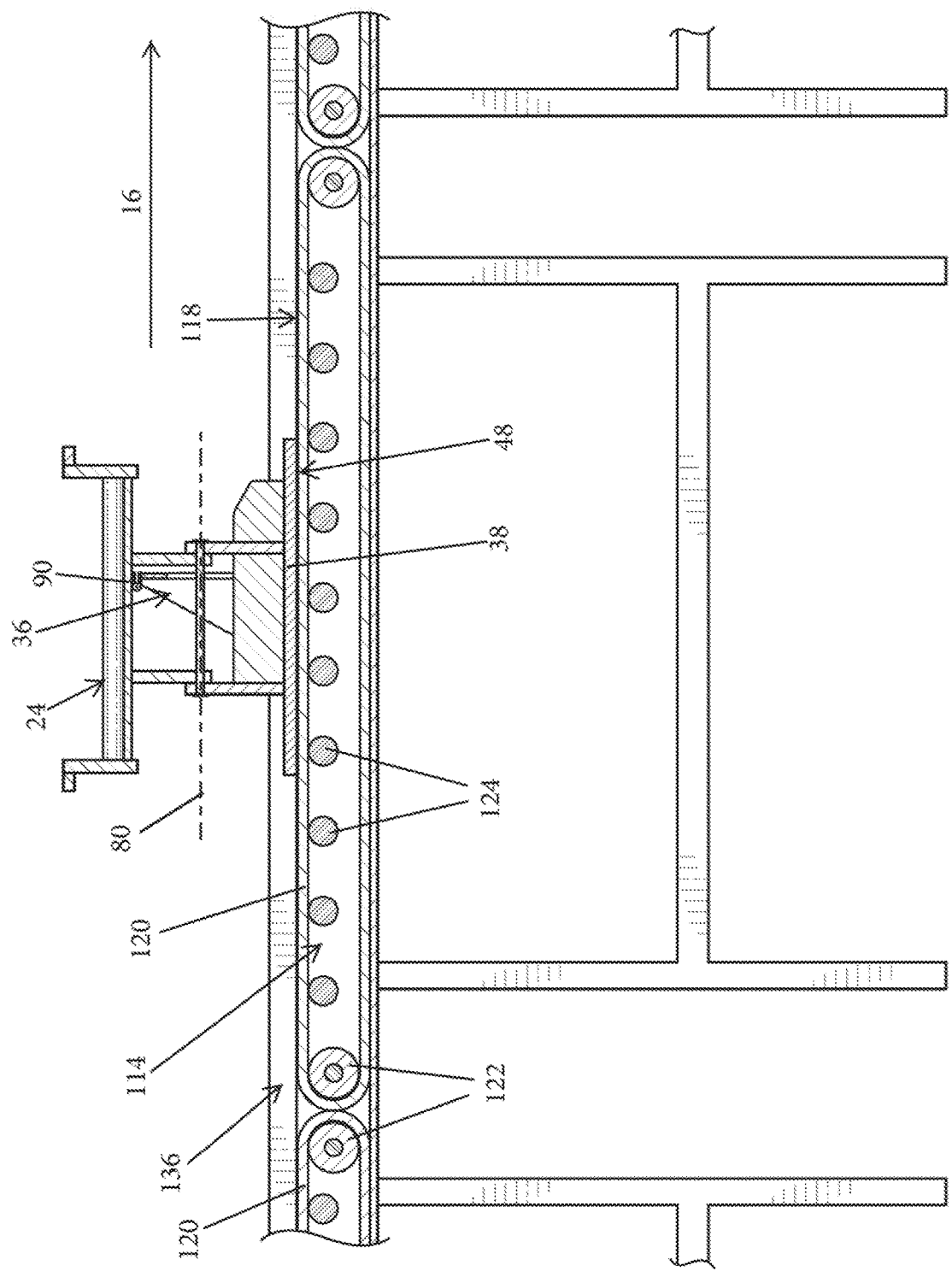
FIG. 7 is a cross section view of the conveyor and products carrying carriage taken along line 7-7 of FIG. 6.

As best seen in FIGS. 7 and 13, the carrying tray 24 is pivotally secured to the base 34 by aligning the shoulder members 54 through holes 58 with the arms 72 through holes 76 and inserting a dowel/pivot shaft 78 therethrough. As should now be appreciated, the products carrying tray 24 is pivotally secured to the base 34 about a tray pivot axis 80 which extends generally parallel to the carriages direction of travel 16 and is between the carrying tray 24 and the base 34.

The latch member 36 is preferably constructed comprising a beam 82 and, as viewed from the front edge 40, left and right legs 84, 86. The left and right legs 84, 86 extend from the beam 82, at opposite ends of a central beam section 88, to their terminal ends 84T, 86T. Left and right legs 84, 86 are generally parallel to one another and, accordingly, the central beam section 88 and the left and right legs 84, 86 form a U-shaped as shown. The front face of the left and right legs 84, 86 define respective cam surfaces 84C, 86C. The latch member 36 is pivotally secured to the carrying tray 24 by hingedly attaching the latch member beam 82, with a hinge 90, to the underside of the central valley section 60 of the carrying tray 24. Accordingly, latch member 36 is pivotable about a latch pivot axis 92 which extends through the hinge 90, is located between the tray pivot axis 80 and the carrying tray 24, and is generally perpendicular to the tray pivot axis 80 and the direction of travel 16.

Figure 11:
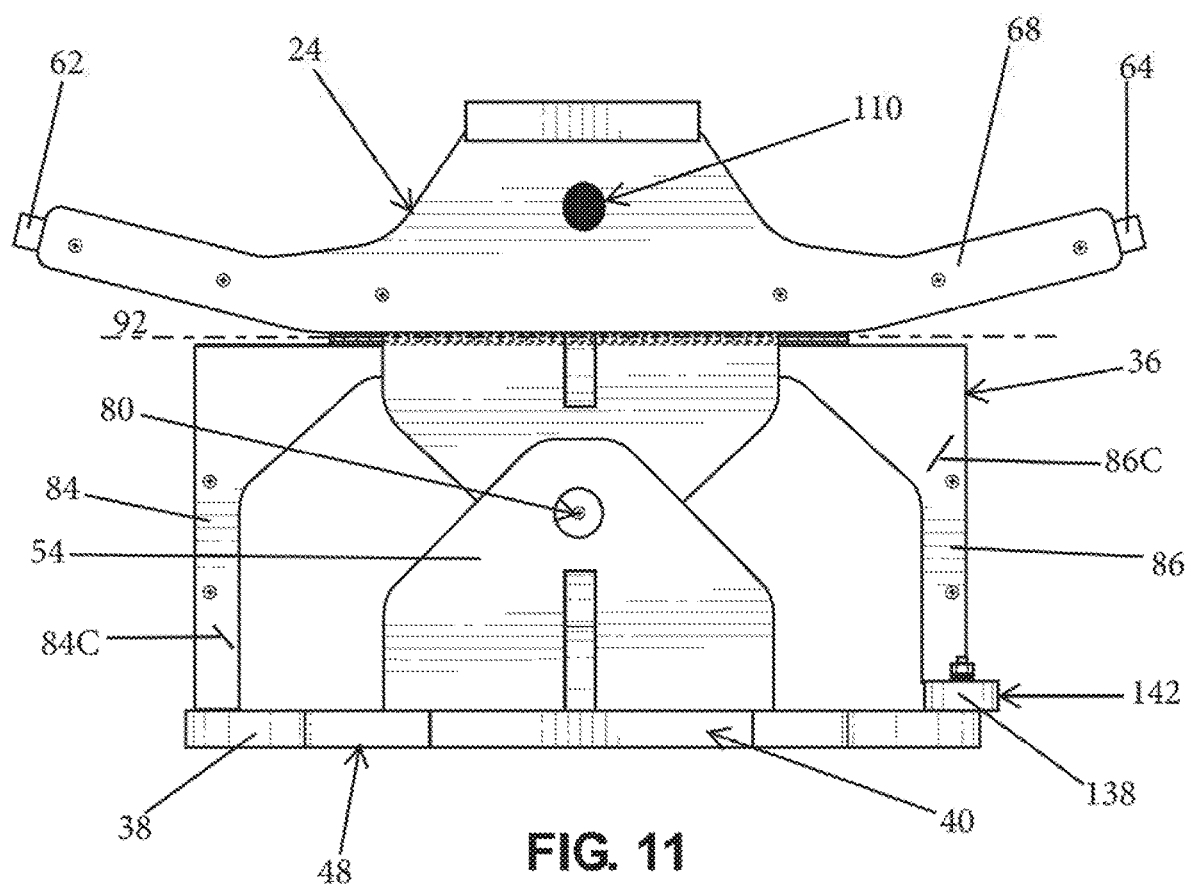
FIG. 11 is front elevation view of the products carrying carriage shown in FIG. 10.
Figure 12:
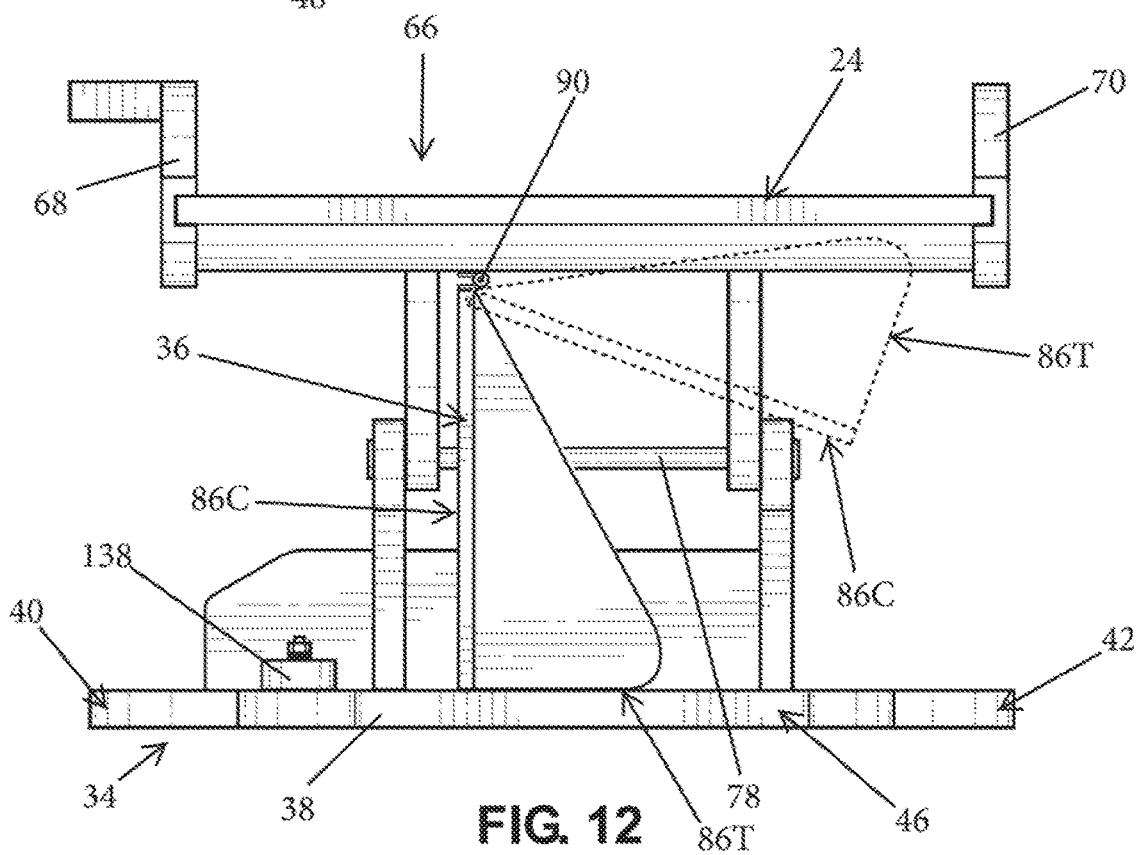
FIG. 12 is a side elevation view of the products carrying carriage shown in FIG. 10 and showing the latch member in solid lines in its latched position and in dash lines in its unlatched position.

As should now be appreciated, the latch member 36 is pivotable about the latch pivot axis 92/hinge 90 between a latched or vertically oriented position as seen in solid lines in FIG. 12 and as shown in FIGS. 6, 7 and 9-11, and an unlatched position as seen in dash lines in FIG. 12 and as shown in FIGS. 8, and 14-16. When the latch member 36 is in its latched position, the latch member cam surfaces 84C, 86C are oriented generally vertically and generally perpendicular to both the tray pivot axis 80 and the latch pivot axis 92. Also, in the latched position, the left and right legs 84, 86 extend between the latch pivot axis 92/carrying tray 24 and the base 34, thereby preventing rotation of the carrying tray 24 about the tray pivot axis 92 and retain the carrying tray 24 in its generally level product carrying position. In the latched position, the respective terminal ends 84T, 86T of the left and right legs 84, 86 are preferably in contact with or adjacent to the base bearing plate 38.

However, when the latch member 36 is in its unlatched position, as best seen in FIG. 12, the latch member cam surfaces 84T, 86C are oriented/extend at an angle relative to the tray pivot axis 80 and perpendicular to the latch pivot axis 92. Also, in the unlatched position, both the left and right legs 84, 86, extend to a position not between the latch pivot axis 92/carrying tray 24 and the base 34 thereby allowing rotation of the carrying tray 24 about the tray pivot axis 80/pivot shaft 78. When the latch member 36 is in its unlatched position, therefore, the carrying tray 24 can be pivoted, at an angle relative to the carrying tray level product carrying position, to a generally tilted product unloading position as seen, for example, in FIG. 14 whereat the carrying tray 24 is tilted towards the right side as viewed from the front edge 40 and in FIG. 15 whereat the carrying tray 24 is tilted toward the left side as viewed from the front edge 40.

Figure 4:
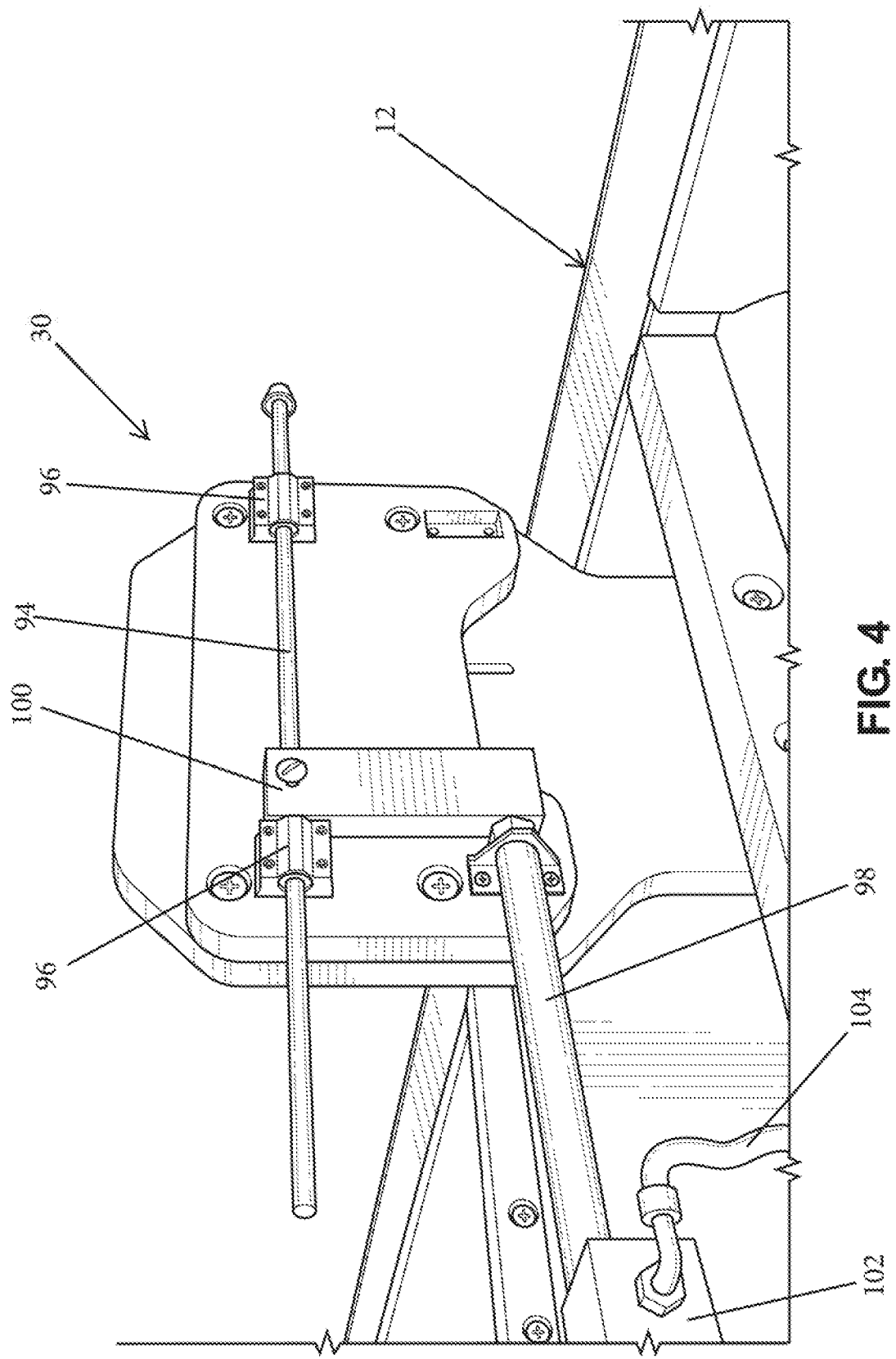
FIG. 4 is a perspective view of the tilt mechanism of the unloading station shown in FIG. 3.

As mentioned herein above, a tilt mechanism 30 is provided at each unloading station 20 and is selectively activated/actuated by the controller (not shown) for tilting the carrying tray 24 to a tilted product unloading position and unloading a product 28 thereon. As best seen in FIG. 4, each tilt mechanism 30 preferably comprises a tipping element/rod/pin 94 slidably captured with guide blocks 96. The piston of a pneumatic cylinder 98 is coupled to the tipping element 94 with a connector 100. Air supply solenoid valves 102 are connected to the pneumatic cylinder 98 and are controlled by the controller for selectively providing pressurized air thereto via air hoses 104 and selectively extending and retracting the piston of the pneumatic cylinder 98. The tipping element 94 is thereby selectively extended as depicted in FIG. 6 by the right side tilt mechanism 30R, and selectively retracted as depicted in FIG. 6 by the left side tilt mechanism 30L.

The tilt mechanisms 30 are located adjacent the conveyor 12 such that, when the tipping element 94 is extended, it will extend into and intersect with a cam travel path 106R, 106L defined by the imaginary path a cam surface 84C, 86C of the respective left and right legs 84, 86 travels as the carriages 14 are traversed along the direction of travel 16. Also, when the tipping element 94 is retracted, it is retracted from and will not intersect with cam travel path 106R, 106L.

Figure 6:
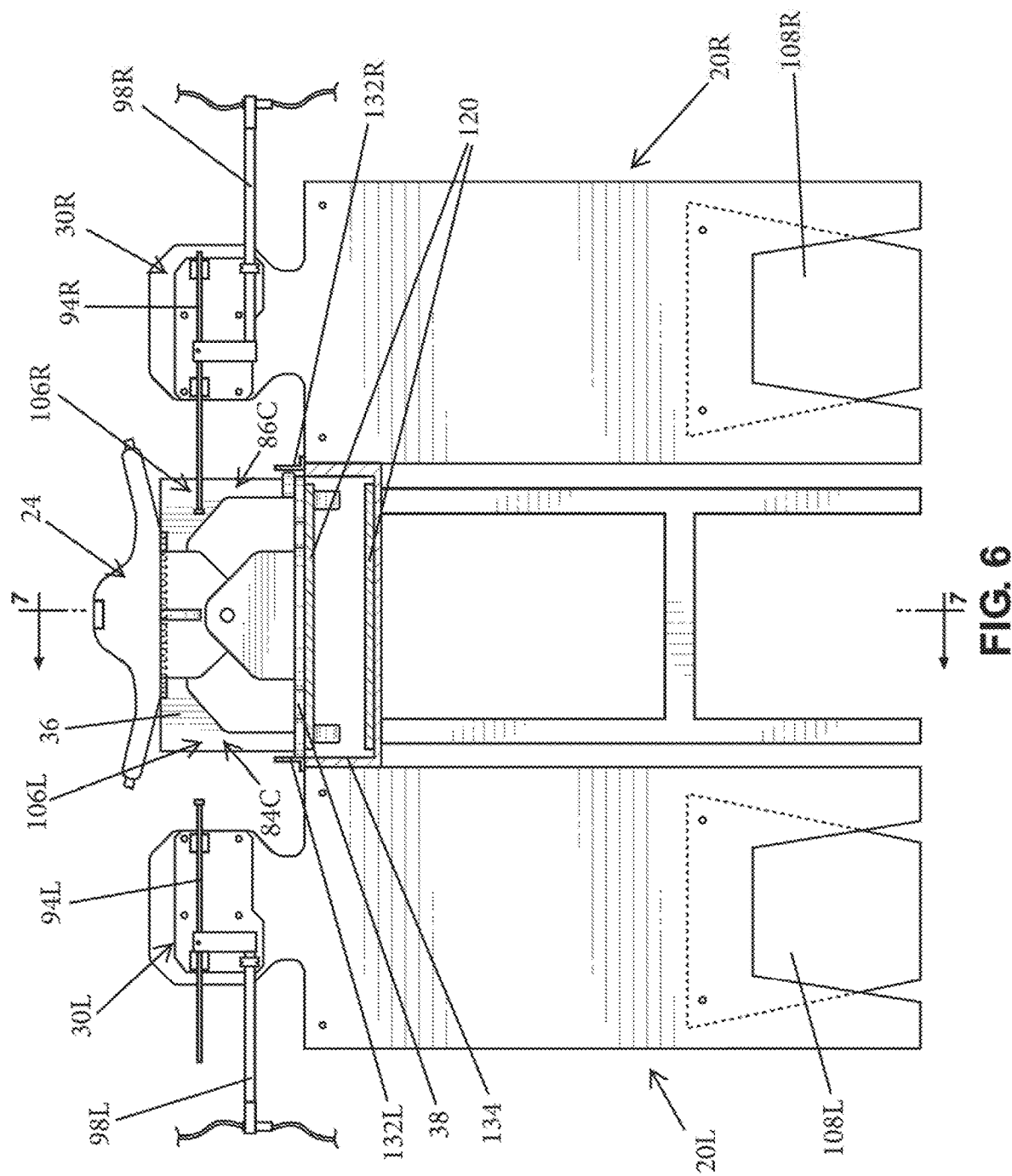
FIG. 6 is a cross section view of the conveyor taken along line 6-6 in FIG. 1 and showing a carriage on the conveyor and adjacent left and right unloading stations and tipping mechanisms.
Figure 15:
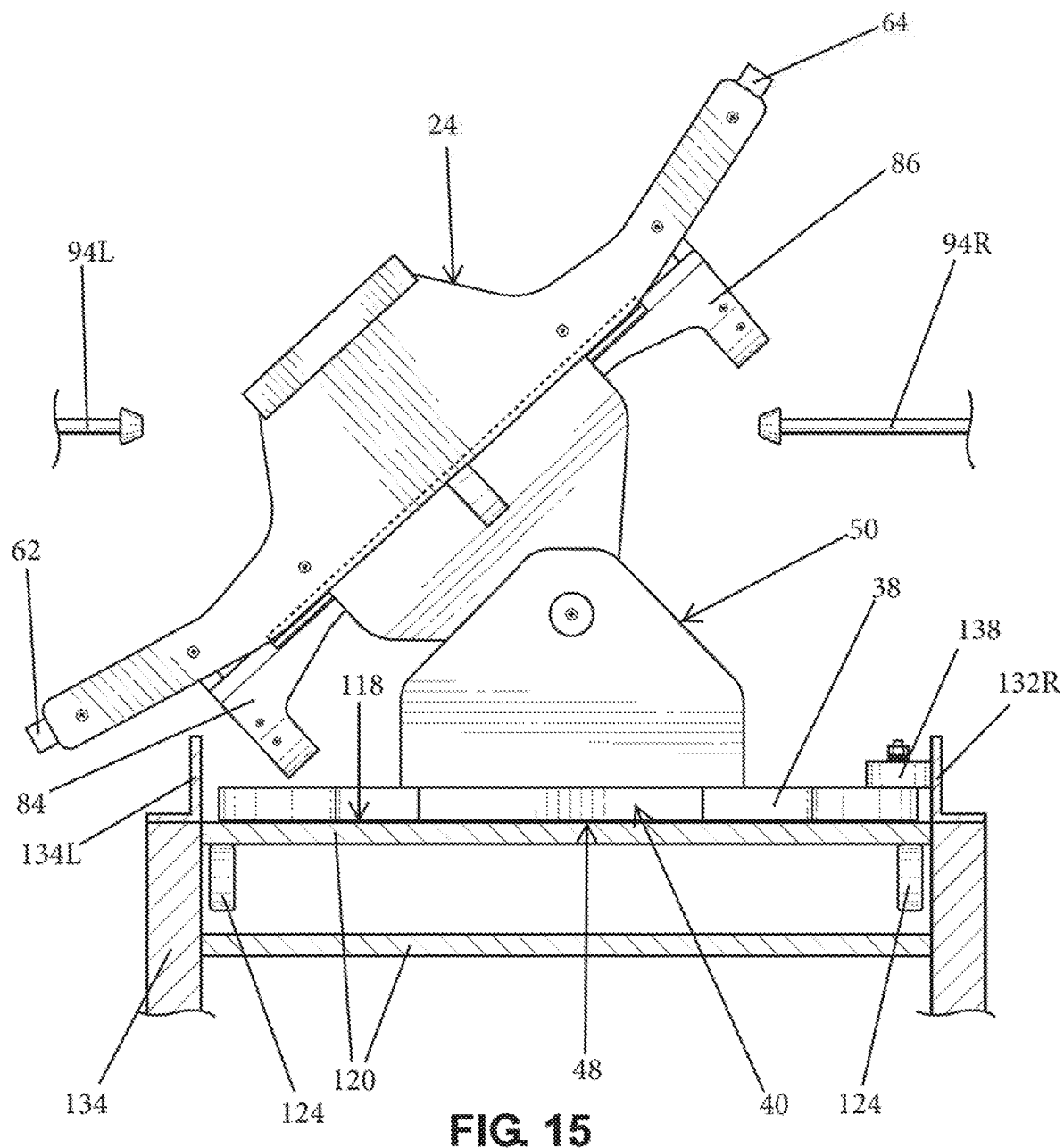
FIG. 15 is a front elevation view of the products carrying carriage shown in FIG. 10 gravitationally resting on a conveyor and showing the right side tipping element extended after having engaged the latch member right leg, and showing the tilt tray with the latch member in its unlatched position and the carrying tray in its unloading position tilted downwardly towards the left side of the conveyor and, FIG. 16 is a perspective view of the products carrying carriage shown in FIG. 10 and showing the latch member in its unlatched position and the carrying tray in its unloading position tilted downwardly towards the left side thereof.
Figure 16:
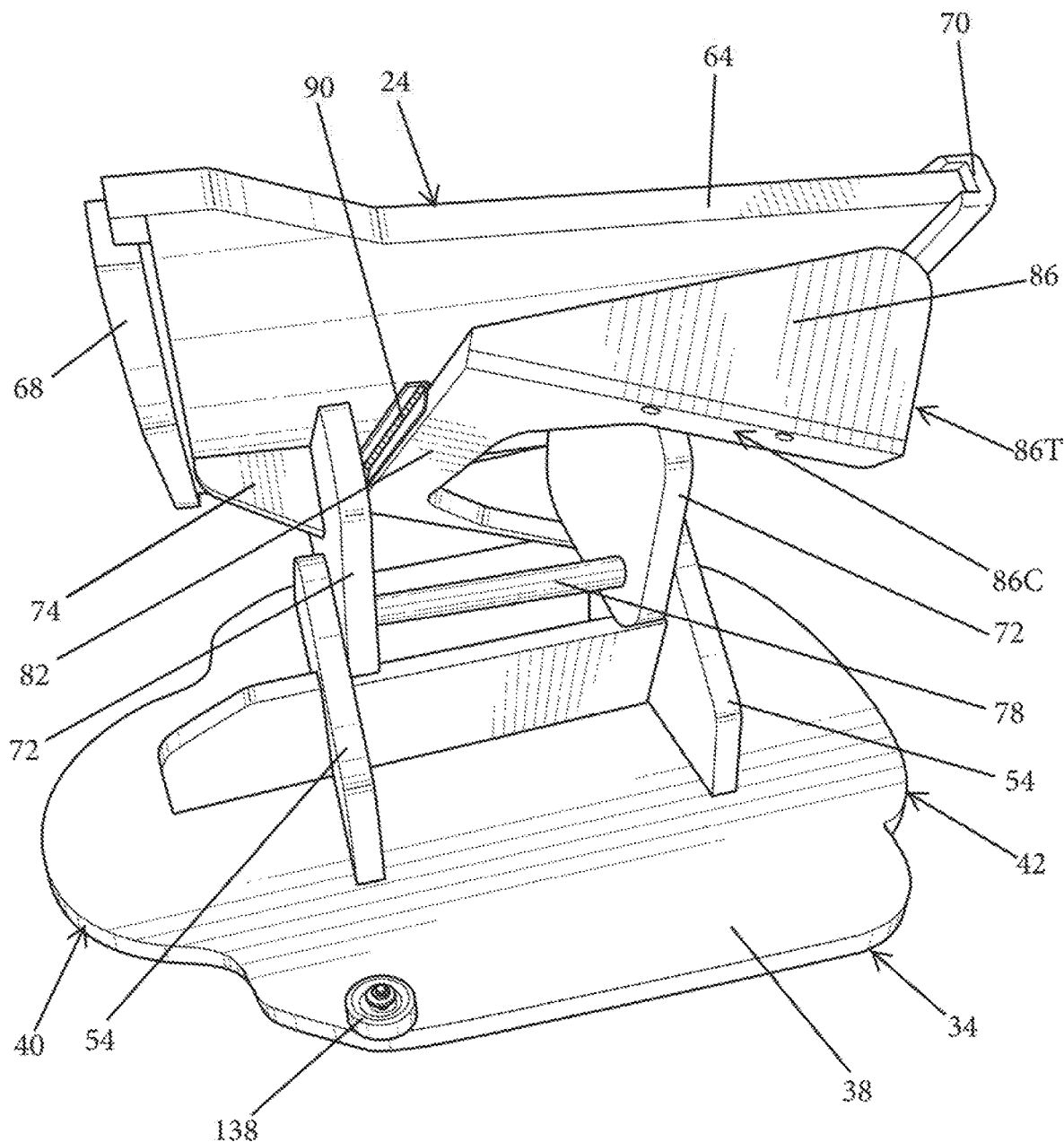

With particular reference now to FIG. 6 wherein, on the right side of the conveyor 12 and carrier 14, an unloading station 20 and tilt mechanism 30 are designated by the respective reference numerals 20R and 30R and, on the left side of the conveyor 12 and carrier 14, an unloading station 20 and tilt mechanism 30 are designated by the respective reference numerals 20R and 30R, the tilting and product unloading operation will be described. When the right tilt mechanism 30R is actuated and the tipping element 94R is extended into the cam travel path 106R, as the carriage 14 traverses adjacent thereto, the tipping element 94R engages the latch member first leg cam surface 86C thereby causing the latch member 36 to pivot to its unlatched position. Simultaneously, the carrier tray 24 is tilted to its unloading position towards the left side as depicted in FIG. 15 and, hence, towards the left unloading station 20L. A product 28 on the carrier tray 24 would then be unloaded/slide off therefrom and into the left container bin 108L of the left unloading station 20L.

Figure 14:
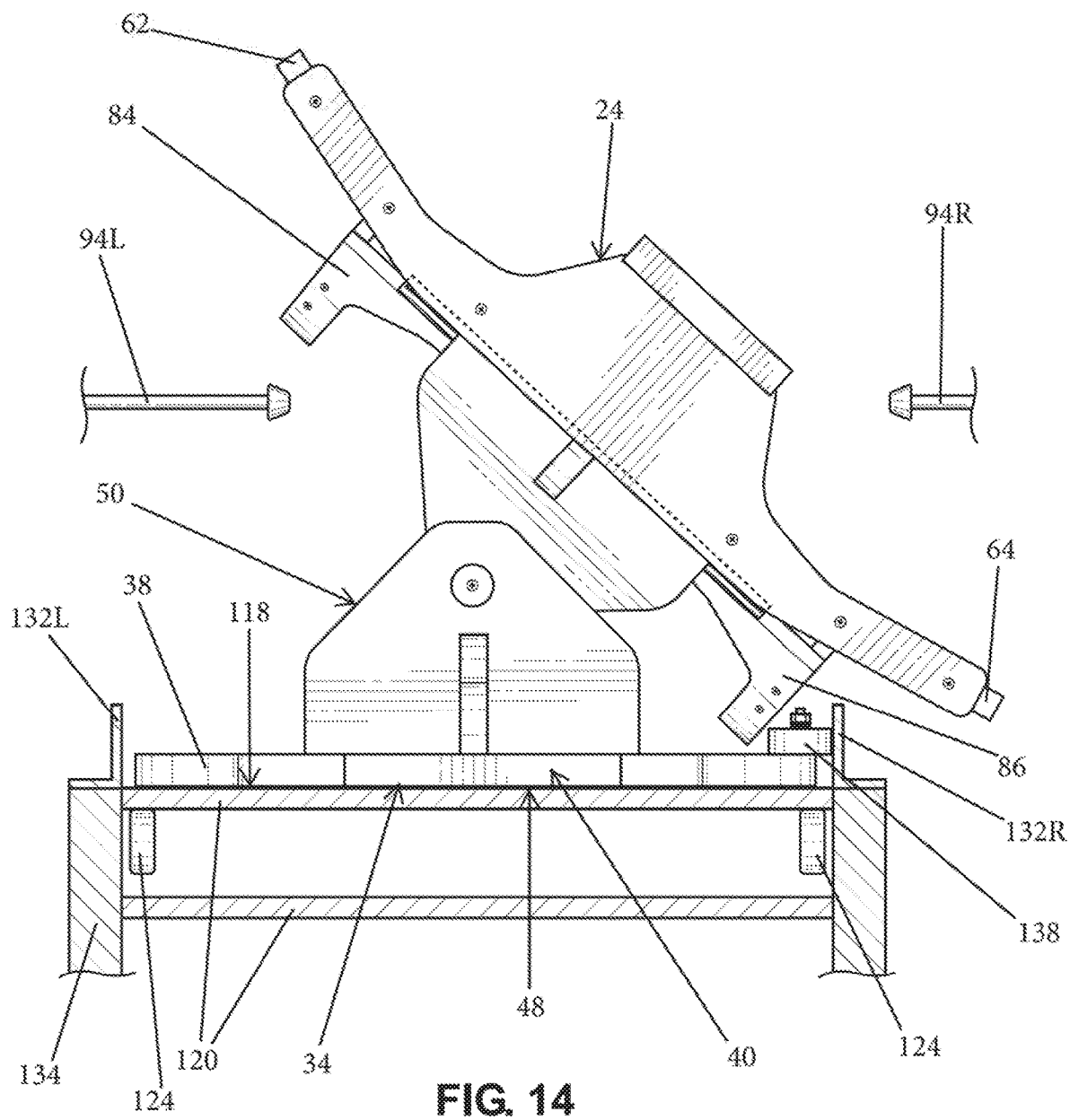
FIG. 14 is a front elevation view of the products carrying carriage shown in FIG. 10 gravitationally resting on a conveyor and showing the left side tipping element extended after having engaged the latch member left leg, and showing the tilt tray with the latch member in its unlatched position and the carrying tray in its unloading position tilted downwardly towards the right side of the conveyor.

Similarly, when the left tilt mechanism 30L is actuated and the tipping element 94L is extended into the cam travel path 106L, as the carriage 14 traverses adjacent thereto, the tipping element 94L engages the latch member first leg cam surface 84C thereby causing the latch member 36 to pivot to its unlatched position. Simultaneously, the carrier tray 24 is tilted to its unloading position towards the right side as depicted in FIG. 14 and, hence, towards the right unloading station 20R. A product 28 on the carrier tray 24 would then be unloaded/slide off therefrom and into the right container bin 108R of the right unloading station 20R.

Of course, when a carriage 14 traverses adjacent left and right tilt mechanisms 30L, 30R and neither of the tipping elements 94L, 94R are extended into the cam travel paths 106L, 106R (both tipping elements 94L, 94R are retracted), neither cam surface 84C, 86C will be engaged and so the latch member 36 will remain in its unlatched position and the carrying tray 24 will remain in its level product carrying position.

Figure 5:
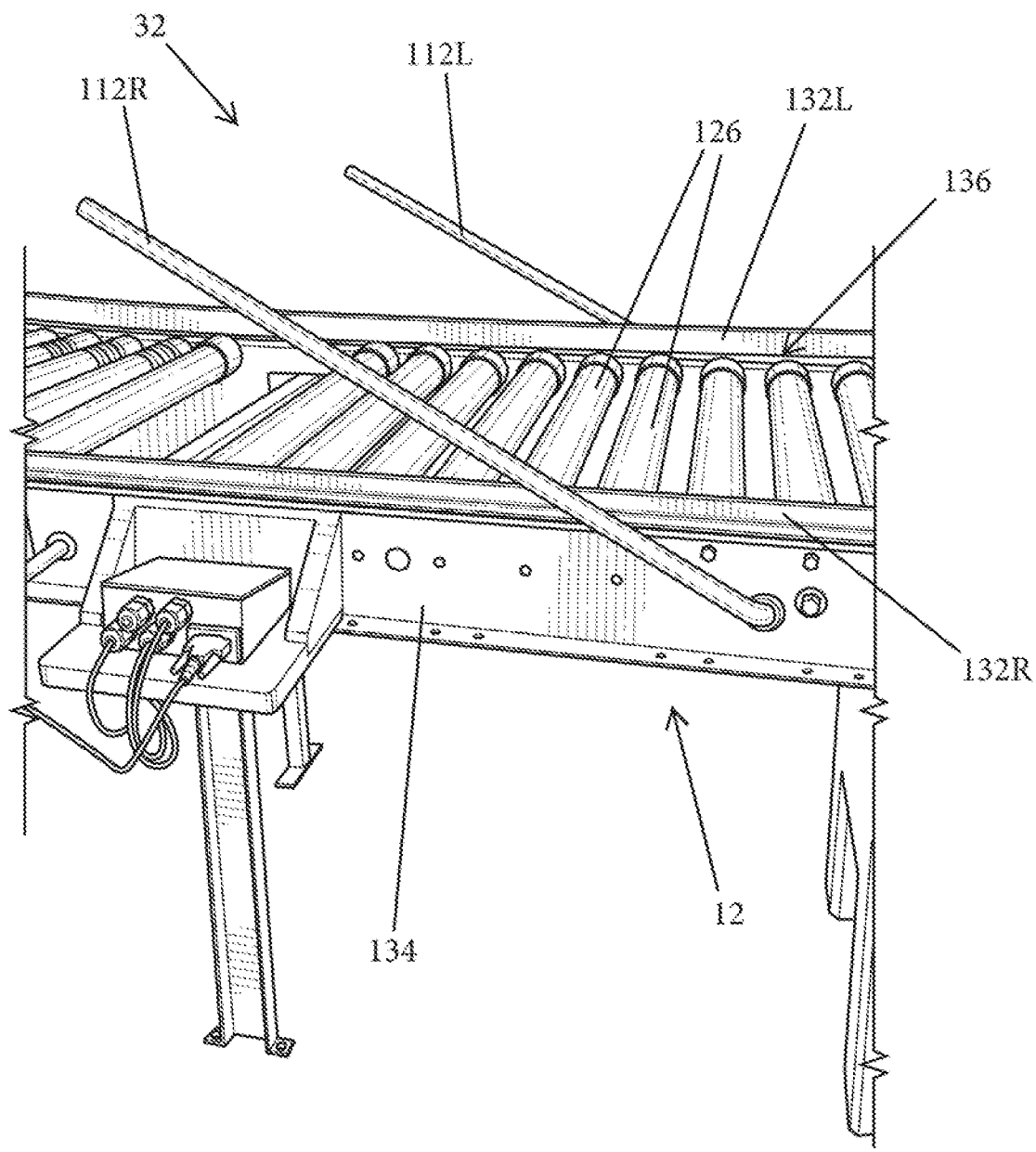
FIG. 5 is a perspective view of one of the leveling stations of the tilting tray products sorting apparatus shown in FIG. 1.

It is noted that because the center of gravity (diagrammatically depicted with a solid black dot and designated by the numeral 110 in FIG. 11) of the products carrying tray 24 together with the latch member 36 is located above the carrying tray pivot axis 80, after the carrying tray 24 is rotated to its tilted product unloading position, absent an outside force, the carrying tray 24 remains in its tilted product unloading position. Also, the carrying tray pivot axis 80/pivot shaft 78 is located between the latch member left and right legs 84, 86 when the latch member 36 is in its unlatched position. Accordingly, as mentioned herein above, after passing through the unloading stations 20, the carriages 14 are traversed to and through a leveling station 32 whereat the carrying trays 24 which are in their tilted product unloading position are restored/pivoted back to their level product carrying position. In this regard, referring to FIGS. 5 and 8, left and right leveling arms/rods 112L, 112R are provided at each leveling station 32. The left leveling arm 112L is provided and secured on the left side of the conveyor 12 as seen in FIG. 8 and extends at an angle upwardly from the conveyor 12 in a direction along the direction of travel 16. The left leveling arm 112L is located adjacent the conveyor 12 such that, when a carriage 14 is traversed adjacent thereto and its carrying tray 24 is tilted downwardly towards the left side thereof, as seen in FIG. 15, leveling arm 112L engages the carrying tray 24 left wing 62 thereby pivoting the carrying tray 24 about the pivot axis 80 back to its level product carrying position. Simultaneously, when the carrying tray 24 is placed in its level product carrying position, the latch member 36 legs 84, 86 are gravitationally pulled downwardly causing the latch member 36 to pivot about the latch pivot axis 92 from its unlatched position to its latched position.

Similarly, the right leveling arm 112R is provided and secured on the right side of the conveyor 12 as seen in FIG. 8 and extends at an angle upwardly from the conveyor 12 in a direction along the direction of travel 16. The right leveling arm 112R is located adjacent the conveyor 12 such that, when a carriage 14 is traversed adjacent thereto and its carrying tray 24 is tilted downwardly towards the right side thereof, as seen in FIGS. 8 and 14, leveling arm 112R engages the carrying tray 24 right wing 64 thereof thereby pivoting the carrying tray 24 about the pivot axis 80 back to its level product carrying position. Simultaneously, when the carrying tray 24 is placed in its level product carrying position, the latch member 36 legs 84, 86 are gravitationally pulled downwardly causing the latch member 36 to pivot about the latch pivot axis 92 from its unlatched position to its latched position.

Advantageously, the carriages 14 are not coupled to the conveyor 12 but, rather, merely gravitationally rest thereon as they are traversed there along. Conveyor 12 can include, for example, one or more of a belt conveyor 114, a driven roller conveyor 116, etc. which define/provide an effective substantially horizontal carrying and traversing surface 118 whereupon the carriages 14 may gravitationally rest and be traversed between the loading stations 18 and unloading stations 20.

In FIGS. 6 and 7, there is shown a belt conveyor 114 comprising an endless belt 120 rotatably driven around end rollers 122 and supported with rollers 124 in a known and customary manner. Belt conveyor 114 hence defines/provides an effective substantially horizontal carrying and traversing surface 118 along the upper surface of the endless belt 120. The base 34 bearing plate planar sled surface 48 rests on and frictionally engages the endless belt 120 carrying and traversing surface 18 and is thereby traversed there along.

In FIGS. 8 and 9, there is shown a driven roller conveyor 116 comprising a plurality of rollers 126. One or more driven shafts 128 extending generally along the direction of travel 16 are coupled to the rollers 126 with endless belts 130 and thereby rotatably drive the rollers 126 in a known and customary manner. Driven roller conveyor 116 hence defines/provides an effective substantially horizontal carrying and traversing surface 118 along the upper surface of each of the rollers 126. Similarly, the base 34 bearing plate planar sled surface 48 rests on and frictionally engages the driven rollers 126 carrying and traversing surface 118 and is thereby traversed there along.

The conveyor 12 includes, as viewed from downstream of the direction of travel 16, left and right side walls 132L, 132R secured to the conveyor 12 frame 134 and projecting upwardly relative to the horizontal carrying and traversing surface 118. Sidewalls 132L, 132R extend generally parallel to the direction of travel 16 and thereby define a corral/trough 136 therebetween and above the carrying and traversing surface 118. As should now be appreciated, as the carriages 14 are traversed along the conveyor 12, the bearing plate 38 thereof, and hence the carriage 14 itself, is contained within the corral 136 between the side walls 132L, 132R and on the carrying and traversing surface 118.

One or more friction reduction wheels 138 may be provided on the carriages 14 for minimizing the friction between the carriage bearing plates 36 and the sidewalls 132L, 132R. As best seen in FIGS. 10 and 11, wheels 138 are adapted to rotate about an axis of rotation 140 which extends generally perpendicular to the conveyor carrying and traversing surface 118. As shown in FIG. 11, wheels 138 are rotatably secured to the bearing plate 38 with their circumferential perimeter 142 extending horizontally beyond the bearing plate 38 left and right side edges 44, 46 so as to effectively contact the conveyor sidewalls 132L, 132R.

As should now also be appreciated, because carriages 14 merely gravitationally rest on the conveyor 12 carrying and traversing surface 118, it is possible for a front/forward end 40 of a rear carriage 14 to contact the rear end/arcuate edge 42 of a forward adjacent carriage 14. In this regard, especially when the carriages are traversed by the conveyor 12 along a nonlinear path, because the bearing plate front/forward edge 40 is arcuate and the bearing plate rear edge 42 is arcuate, the edges 40, 42 will engage each other at a single point of contact and thereby minimize friction therebetween.

While this invention has been described as having an exemplary design, the present invention may be further modified within the spirit and scope of this disclosure. This application is therefore intended to cover any variations, uses, or adaptations of the invention using its general principles.

What is claimed is:

1. A tilting tray products sorting apparatus comprising:
   a conveyor adapted to traverse a plurality of products carriages in a direction of travel between a loading station whereat products are selectively loaded on the carriages and unloading stations whereat products on the carriages are selectively unloaded;

wherein the plurality of products carriages each comprise a products carrying tray adapted to selectively be placed and maintained in a generally level product carrying position and to selectively be placed in a generally tilted product unloading position at an angle relative to said product carrying position;

wherein said conveyor comprises a carrying and traversing surface;

wherein said products carriages gravitationally rest on said conveyor carrying and traversing surface and are thereby traversed between said loading station and said unloading stations; and, wherein said conveyor comprises one or more of a belt conveyor and a driven roller conveyor which define said carrying and traversing surface.

2. The tilting tray products sorting apparatus of claim 1 wherein said conveyor further comprises:

first and second side walls;

wherein each side wall projects vertically upwardly relative to said carrying and traversing surface and extends generally parallel to said carriages direction of travel; and, wherein said first and second side walls are spaced from each other and thereby define a corral therebetween and above said carrying and traversing surface, whereby carriages traversed between said loading station and said unloading stations are contained within said corral by said side walls and are thereby maintained on said carrying and traversing surface.

3. The tilting tray products sorting apparatus of claim 2 wherein said plurality of products carriages each further comprise a friction reduction wheel adapted to rotate about an axis of rotation extending generally perpendicular to said conveyor carrying and traversing surface and adapted to contact one of said side walls.

4. The tilting tray products sorting apparatus of claim 2 wherein said plurality of products carriages each further comprise:

a friction reduction wheel adapted to rotate about an axis of rotation extending generally perpendicular to said conveyor carrying and traversing surface and adapted to contact one of said side walls:

a base defining a substantially horizontal planer sled surface, said carrying and traversing surface is oriented substantially horizontally, and wherein said planer sled surface gravitationally rests on said conveyor substantially horizontal carrying and traversing surface; and, wherein said base further comprises a forward arcuate end and a rear arcuate end and wherein, in the event said carriages are traversed by said conveyor along a nonlinear path and the front end of a first rear carriage contacts the rear end of a second forward adjacent carriage, said first carriage forward arcuate end engages said second carriage rear arcuate end at a single point of contact along and between said forward arcuate end and said rear arcuate end.

5. The tilting tray products sorting apparatus of claim 2 wherein said conveyor forms an closed loop whereby, after said carriages are traversed to said unloading stations, they are returned to said loading station.

6. The tilting tray products sorting apparatus of claim 1 further comprising machine readable indicia secured to each said carriage.

7. The tilting tray products sorting apparatus of claim 1 wherein said conveyor forms a closed loop whereby, after said carriages are traversed to said unloading stations, they are returned to said loading station.

8. A tilting tray products sorting apparatus comprising:

a conveyor adapted to traverse a plurality of products carriages in a direction of travel between a loading station whereat products are selectively loaded on the carriages and unloading stations whereat products on the carriages are selectively unloaded;

wherein the plurality of products carriages each comprise a products carrying tray adapted to selectively be placed and maintained in a generally level product carrying position and to selectively be placed in a generally tilted product unloading position at an angle relative to said product carrying position;

wherein said conveyor comprises a carrying and traversing surface, wherein said products carriages gravitationally rest on said conveyor carrying and traversing surface and are thereby traversed between said loading station and said unloading stations; and, wherein said plurality of products carriages each further comprise a base defining a substantially horizontal planer sled surface, said carrying and traversing surface is oriented substantially horizontally, and wherein said planer sled surface gravitationally rests on said conveyor substantially horizontal carrying and traversing surface.

9. A tilting tray products sorting apparatus comprising:

a conveyor adapted to traverse a plurality of products carriages in a direction of travel between a loading station whereat products are selectively loaded on the carriages and unloading stations whereat products on the carriages are selectively unloaded;

wherein the plurality of products carriages each comprise a products carrying tray adapted to selectively be placed and maintained in a generally level product carrying position and to selectively be placed in a generally tilted product unloading position at an angle relative to said product carrying position;

wherein said conveyor comprises a carrying and traversing surface;

wherein said products carriages gravitationally rest on said conveyor carrying and traversing surface and are thereby traversed between said loading station and said unloading stations; and, wherein said plurality of products carriages each further comprise a base having a forward arcuate end and a rear arcuate end and wherein, in the event said carriages are traversed by said conveyor along a nonlinear path and the front end of a first rear carriage contacts the rear end of a second forward adjacent carriage, said first carriage forward arcuate end engages said second carriage rear arcuate end at a single point of contact along and between said forward arcuate end and said rear arcuate end.

10. A tilting tray products sorting apparatus comprising:

a conveyor adapted to traverse a plurality of products carriages in a direction of travel between a loading station whereat products are selectively loaded on the carriages and unloading stations whereat products on the carriages are selectively unloaded, wherein the plurality of products carriages each comprise:

a base;

a products carrying tray pivotally secured to said base about a tray pivot axis located between said base and said carrying tray and extending generally parallel to the carriages direction of travel;

a latch member comprising a beam and first and second legs extending from said beam at opposite ends of a central beam section, said legs extending generally parallel to each other whereby said central beam section and said first and second legs form a U-shape;

wherein said central beam section is pivotally secured to said carrying tray about a latch pivot axis located between said tray pivot axis and said carrying tray and extending generally perpendicular to the carriages direction of travel; and, wherein said latch member is pivotable about said latch pivot axis between a latched position whereat said legs extend between said latch pivot axis and said base thereby preventing rotation of said carrying tray about said tray pivot axis and retaining said carrying tray in a generally level product carrying position, and an unlatched position whereat said legs extend to a position not between said latch pivot axis and said base thereby allowing rotation of said carrying tray about said tray pivot axis to a generally tilted product unloading position at an angle relative to said product carrying position, whereby products loaded on said carrying tray are maintained thereon as the carriage traverses between the loading station and the unloading station by placing said latch member in its latched position and maintaining said carrying tray in its level product carrying position, and whereby products loaded on said carrying tray may be unloaded therefrom by pivoting said latch member to its unlatched position and rotating said carrying tray about said tray axis to its tilted product unloading position.

11. The tilting tray products sorting apparatus of claim 10 wherein said latch member first and second legs comprise a cam surface extending at an angle relative to said carrying tray pivot axis when said latch member is in its unlatched position.

12. The tilting tray products sorting apparatus of claim 10 further comprising:

a first mechanism adjacent a first side of the conveyor adapted to selectively extend and retract a first tipping element between extended and retracted positions;

wherein, in its extended position, said first tipping element intersects with a first leg travel path defined by a path said latch member first leg travels as said carriages traverse along their direction of travel and, in its retracted position, said first tipping element does not intersect with said first leg travel path;

wherein, when said first tipping element is extended to its extended position while a carriage traverses adjacent thereto, said first tipping element engages said latch member first leg thereby pivoting said latch member to its unlatched position and rotating said carrying tray about said tray axis to a tilted product unloading position in a downwardly direction towards a second side of the conveyor; and, wherein, when said first tipping element is retracted to its retracted position while a carriage traverses adjacent thereto, said first tipping element does not engage said latch member first leg thereby allowing said latch member to remain in its latched position and said carrying tray in its level product carrying position.

13. The tilting tray products sorting apparatus of claim 12 further comprising:

a second mechanism adjacent said second side of the conveyor adapted to selectively extend and retract a second tipping element between extended and retracted positions;

wherein, in its extended position, said second tipping element intersects with a second leg travel path defined by a path said latch member second leg travels as said carriages traverse along their direction of travel and, in its retracted position, said second tipping element does not intersect with said second leg travel path;

wherein, when said second tipping element is extended to its extended position while a carriage traverses adjacent thereto, said second tipping element engages said latch member second leg thereby pivoting said latch member to its unlatched position and rotating said carrying tray about said tray axis to a tilted product unloading position in a downwardly direction towards said first side of the conveyor; and, wherein, when said second tipping element is retracted to its retracted position while a carriage traverses adjacent thereto, said second tipping element does not engage said latch member second leg thereby allowing said latch member to remain in its latched position and said carrying tray in its level product carrying position.

14. The tilting tray products sorting apparatus of claim 13 further comprising:

a first leveling arm adjacent said first side of the conveyor and a second leveling arm adjacent said second side of the conveyor;

wherein, when a carriage traverses adjacent said first leveling arm and said carrying tray is in a tilted product unloading position in a downwardly direction towards said first side of the conveyor, said first leveling arm engages said carrying tray thereby pivoting said carrying tray about said pivot axis back to its level product carrying position and thereby also allowing said latch member to pivot from its unlatched position to its latched position; and, wherein, when a carriage traverses adjacent said second leveling arm and said carrying tray is in a tilted product unloading position in a downwardly direction towards said second side of the conveyor, said second leveling arm engages said carrying tray thereby pivoting said carrying tray about said pivot axis back to its level product carrying position and thereby also allowing said latch member to pivot from its unlatched position to its latched position.

15. The tilting tray products sorting apparatus of claim 14 wherein said products carrying tray pivot axis is located between said latch member first and second legs when said latch member is in its latched position;

wherein said products carrying tray and said latch member pivotally secured thereto together comprise a center of gravity above said carrying tray pivot axis whereby, after said carrying tray is rotated to its tilted product unloading position, said carrying tray is maintained in its lilted product unloading position; and, wherein said latch member first and second legs comprise a cam surface extending at an angle relative to said carrying tray pivot axis when said latch member is in its unlatched position.

16. The tilting tray products sorting apparatus of claim 15 further comprising machine readable indicia secured to said carrying tray.

17. The tilting tray products sorting apparatus of claim 12 further comprising:

a leveling arm adjacent said second side of the conveyor and, wherein, when a carriage traverses adjacent said leveling arm and said carrying tray is in a tilted product unloading position in a downwardly direction towards said second side of the conveyor, said leveling arm engages said carrying tray thereby pivoting said carrying tray about said pivot axis back to its level product carrying position and thereby also allowing said latch member to pivot from its unlatched position to its latched position.

18. The tilting tray products sorting apparatus of claim 12 wherein said latch member first and second legs comprise a cam surface extending at an angle relative to said carrying tray pivot axis when said latch member is in its unlatched position, and wherein said first tipping element engages said first leg cam surface to rotate said carrying tray about said tray pivot axis to its tilted product unloading position in a downwardly direction towards said second side of the conveyor.

19. The tilting tray products sorting apparatus of claim 10 wherein said products carrying tray pivot axis is located between said latch member first and second legs when said latch member is in its latched position.

20. The tilting tray products sorting apparatus of claim 10 wherein said products carrying tray and said latch member pivotally secured thereto together comprise a center of gravity above said carrying tray pivot axis whereby, after said carrying tray is rotated to its tilted product unloading position, said carrying tray is maintained in its lilted product unloading position.

* * * * *

UNITED STATES PATENT AND TRADEMARK OFFICE
CERTIFICATE OF CORRECTION

PATENT NO. : 10,974,913 B1  
APPLICATION NO. : 16/676720  
DATED : April 13, 2021  
INVENTOR(S) : John Eaton Nussbaum Page 1 of 1

It is certified that error appears in the above-identified patent and that said Letters Patent is hereby corrected as shown below:

In the Claims

Claim 15, Line 58, delete "lilted" and insert --tilted--

Claim 20, Line 29, delete "lilted" and insert --titled--

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*